United States Patent
Ginder et al.

(10) Patent No.: US 9,799,015 B2
(45) Date of Patent: Oct. 24, 2017

(54) AUTOMATED VEHICLE LOAN PAYMENT REMINDERS

(71) Applicant: FORD GLOBAL TECHNOLOGIES, LLC, Dearborn, MI (US)

(72) Inventors: John Matthew Ginder, Plymouth, MI (US); Yimin Liu, Ann Arbor, MI (US); Oleg Yurievitch Gusikhin, West Bloomfield, MI (US); Perry Robinson MacNeille, Lathrup Village, MI (US); Paul Duncan McCarthy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 740 days.

(21) Appl. No.: 13/795,469

(22) Filed: Mar. 12, 2013

(65) Prior Publication Data
US 2014/0279449 A1    Sep. 18, 2014

(51) Int. Cl.
*G06Q 40/00* (2012.01)
*G06Q 20/10* (2012.01)

(52) U.S. Cl.
CPC ................ *G06Q 20/102* (2013.01)

(58) Field of Classification Search
CPC .............. G06Q 40/00; G06Q 20/10
USPC ......................................... 705/40
See application file for complete search history.

(56) References Cited

U.S. PATENT DOCUMENTS

| | | | |
|---|---|---|---|
| 2001/0001148 A1* | 5/2001 | Martin et al. | 705/39 |
| 2004/0199467 A1* | 10/2004 | Martin et al. | 705/43 |
| 2008/0167017 A1* | 7/2008 | Wentker et al. | 455/414.1 |
| 2010/0287093 A1* | 11/2010 | He et al. | 705/38 |
| 2011/0276383 A1* | 11/2011 | Heiser et al. | 705/14.25 |

FOREIGN PATENT DOCUMENTS

| | | |
|---|---|---|
| AU | 2003266781 A1 | 6/2004 |
| CN | 102594995 A | 7/2012 |

OTHER PUBLICATIONS

Machine Translation of CN 102594995.
Android App Bill Reminder, Website Screen Capture, https://play.google.com/store/apps/details?id=com.handyapps.billsreminder15&hl=en.

* cited by examiner

*Primary Examiner* — Lindsay M Maguire
(74) *Attorney, Agent, or Firm* — Jennifer M. Stec; Brooks Kushman P.C.

(57) ABSTRACT

A payment reminder may be received by a payment reminder application executed by a computing device. The payment reminder may request payment of a vehicle loan associated with a registered combination of a vehicle identification number and an occupant identifier associated with the vehicle loan. The payment reminder application may verify appropriate vehicle occupants are available to receive the payment reminder, and may deliver the received payment reminder to the appropriate vehicle occupants at an appropriate time for occupant safety and privacy. The payment reminder application may also provide other types of reminders or messages targeted to the vehicle occupants.

20 Claims, 5 Drawing Sheets

AUTOMATED VEHICLE LOAN PAYMENT REMINDERS

BACKGROUND

According to one source, 64% of new vehicle purchases are financed in the United States. Thus, for a majority of new vehicle purchases, a loan provider takes on some measure of loan delinquency risk. If a borrower fails to meet the obligation to pay off the loan, the purchased vehicle may be repossessed and sold at auction. An estimated 10 million vehicles were delinquent in 2009 and between 3.5-5.0 million vehicles were repossessed.

One way to reduce the loan delinquency rate is reminding borrowers ahead of payment due dates that a payment will be due. However, if the borrower did not leave current contact information with the loan company, or if the contact information became out-of-date, it is difficult for loan companies to reach the borrower to send out the reminders, let alone to ensure that the borrower receives them.

Some lenders have strategies for preventing delinquencies that start with a borrower contacting the lender. However, in many vehicle repossessions, the borrower may be unaware of any delinquency and therefore unable to initiate lender contact. In other cases, customers in later stage delinquency may not understand the critical need to work with the lender to avoid an impending repossession. In fact, many vehicles are repossessed with the lender never having successfully contacted the borrower regarding the delinquency.

SUMMARY

A method includes receiving, by a vehicle-based computing system, a payment reminder requesting payment of a vehicle loan associated with a registered combination of a vehicle identification number and an occupant identifier associated with the vehicle loan; verifying appropriate vehicle occupants are available to receive the payment reminder; and delivering the received payment reminder to the appropriate vehicle occupants at an appropriate time for occupant safety and privacy.

A method includes receiving, by a loan credit server from a loan provider, indications of vehicles and associated occupants to receive payment reminders; sending the payment reminders to the vehicles; and receiving confirmation from the vehicles of successful delivery of the payment reminders to occupants of the vehicles.

A computing device stores a payment reminder application executable by a processor of the computing device to provide operations including: receiving a payment reminder requesting at least one of contact with a lender of a vehicle loan and payment of the vehicle loan, the vehicle loan being associated with a registered combination of a vehicle identification number of a vehicle and an occupant identifier indicative of an occupant of the vehicle; verifying appropriate vehicle occupants are available to receive the payment reminder; and delivering the received payment reminder to the appropriate vehicle occupants at an appropriate time for occupant safety and privacy.

DETAILED DESCRIPTION

A system may include a payment reminder application embedded in a vehicle-based computing system (VCS) of a vehicle, in a mobile device (e.g., smartphone) connected to the VCS, or installed on a network server in communication with the VCS. The payment reminder application may be in communication with a loan credit server, and may be configured to send a vehicle identifier number/occupant identifier pair to the loan credit server to receive information indicative of any pending reminders to be provided to the vehicle occupant. A payment reminder may include an alert of a pending payment due, a due date, and a request for the occupant to call a particular auto loan company number, if necessary.

The payment reminder application may offer further functionality, such as provisioning of a telephone number on the VCS console or the mobile phone to provide the occupant with an option to make a return call regarding the payment, facilitating borrower querying of a current loan balance, allowing borrowers to make a payment using the VCS, allowing borrowers to cancel and store reminders for later action, provisioning of last-minute reminders for impending payments, and returning notifications of reminder delivery and payment back to the load credit server.

To avoid unnecessarily distracting the occupant when busy, the payment reminder application may be configured to prioritize the urgency of received payment reminders and deliver received payment reminders at appropriate times based on the occupant's workload estimation, such as when the responsible party is alone in the vehicle and/or when the vehicle is stopped or being driven in a low risk situation. Moreover, to protect the privacy of the occupant of the vehicle, the payment reminder application may be configured to hold the payment reminder until the occupant is alone in the vehicle.

Figure 1A:
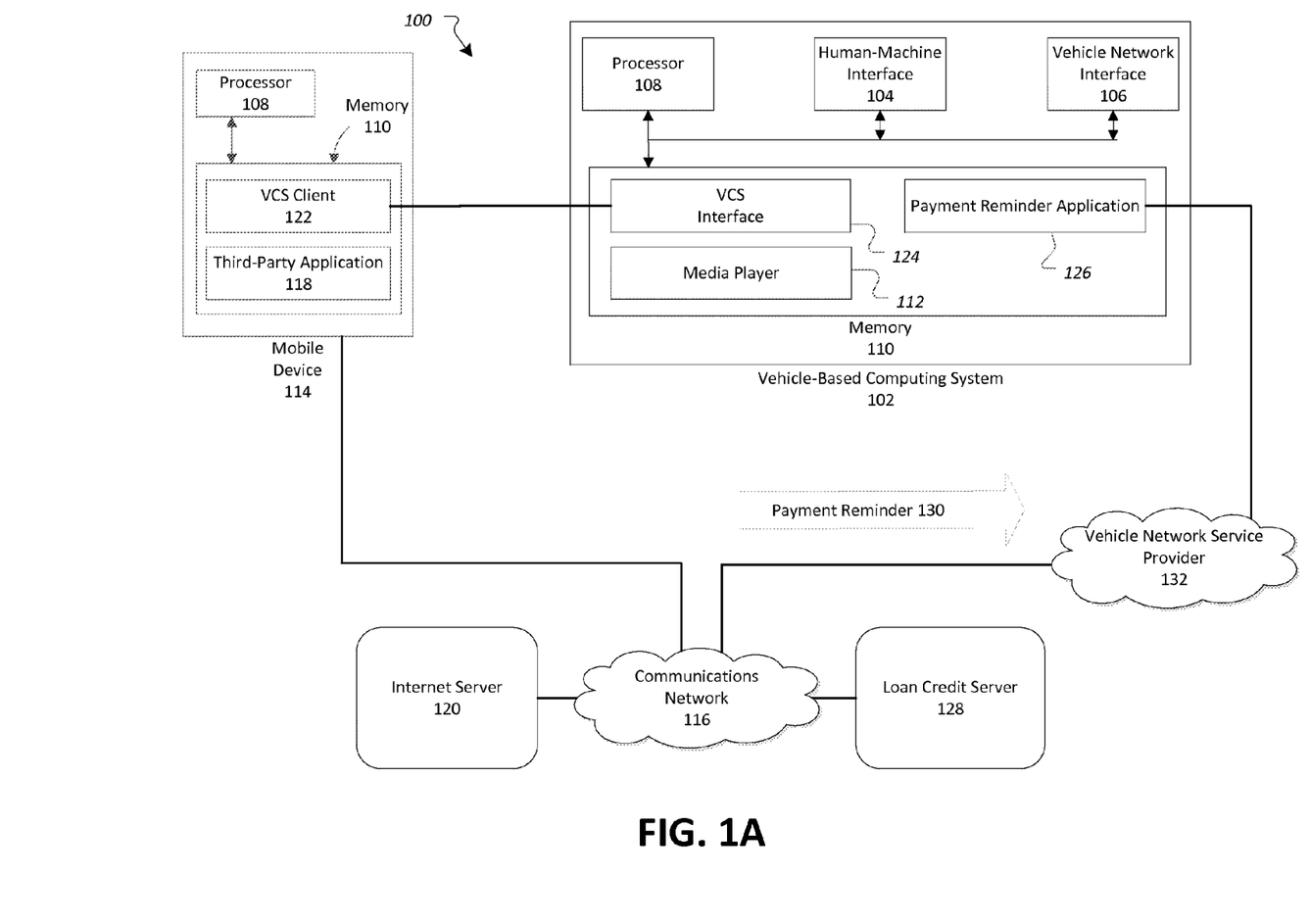
FIG. 1A-1C illustrate exemplary system for the provisioning of payment reminders to vehicle occupants using a payment reminder application.

FIG. 1A illustrates an exemplary system 100 for the provisioning of payment reminders to vehicle occupants using a payment reminder application 126. The system 100 may include a VCS 102 included in a vehicle, where the vehicle is able to transport one or more vehicle occupants. The VCS 102 may include a human-machine interface (HMI) 104, a vehicle network interface 108, and one or more processors 108 and memories 110. The memory 110 may store applications such as a media player 112, a VCS interface 124, and a payment reminder application 126. The system may also include a mobile device 114 connected to a communications network 116 and including a processor 108 that execute instructions stored on a memory 110, such as those of a third-party application 118 or those of a VCS client 122. The system may also include an internet server 120 and a loan credit server 128 connected to the communications network 116 and configured to provide payment reminders 130 over a vehicle network service provider 132. The system 100 may take many different forms and includes multiple and/or alternate components and facilities. While an exemplary system 100 is shown in FIG. 1A, the exemplary components illustrated of the system 100 are not intended to be limiting. Indeed, additional or alternative components and/or implementations may be used.

The VCS 102 may be configured to provide computing services to the occupants of the vehicle, such as vehicle health reports, turn-by-turn directions, and searches for local business, and hands-free calling, as some examples. An exemplary VCS 102 may be the SYNC® system manufactured by The Ford Motor Company of Dearborn, Mich.

The VCS 102 may include various human-machine interface (HMI) 104 elements configured to provide for occupant interaction with the VCS 102. As some non-limiting examples, the VCS 102 may include one or more of: a microphone to receive sound input from vehicle occupants; an auxiliary jack and associated audio circuitry to receive audio input from audio devices; one or more speakers to provide audio output; a visual or touch screen display to provide visual output or in some cases touch input; a haptic feedback mechanism, a USB® subsystem to send and receive data input from storage devices such as flash memory drives; a location subsystem (e.g., utilizing GPS or cell tower triangulation as some examples) to send and receive location, destination, and heading information; and a Bluetooth® input configured to facilitate device pairing and data transfer between the VCS 102 and Bluetooth®-enabled devices.

The VCS 102 may further include a vehicle network interface 106 in communication with other components of the vehicle by way of use of a vehicle network, such as via a vehicle controller area network (CAN). For instance, the vehicle network interface 106 may allow the VCS 102 to communicate with a workload estimator module configured to provide information with respect to the status of the occupant, such as situational driving demands, level of driver drowsiness, or apparent correctness of driver inputs responsive to the driving situation. As further examples, the vehicle network interface 106 may be configured to facilitate communication with a restraint control module configured to provide sensed occupancy information for the vehicle (e.g., which seats have weight on them, which seat belts are buckled, etc.) and/or an occupant classification module (e.g., of a passenger restraint system) configured to utilize seat or other sensors to provide information regarding the number of passengers in a vehicle as well as their sizes and weights.

The VCS 102 may include one or more processors 108 configured to execute application instructions stored on a memory 110 of the VCS 102, thereby allowing the VCS 102 to control the input and output components in support of the computing services. One such application may be a media player application 112 configured to provide audio and video presentations to the vehicle occupants. Another such application may be the payment reminder application 126 discussed in further detail below.

The mobile device 114 may be any of various models of networked device, such as cellular phones, tablet computers, or other types of portable computing devices capable of execution applications and communicate over a communications network 116. The communications network 116 may provide communications services, such as packet-switched network services (e.g., Internet access, VoIP communication services), to devices connected to the communications network 116. An exemplary communications network 116 may include a cellular telephone network. To facilitate the communications over the communications network 116, mobile devices 114 may be associated with unique device identifiers (e.g., mobile device numbers (MDNs), internet protocol (IP) addresses, etc.) to indicate, reference, or allow for the selective communication of the mobile devices 114 over the communications network 116.

In some cases, the VCS 102 may be configured to use a network transceiver (e.g., a Bluetooth® module) to communicate with a mobile device 114 of an occupant carried into the vehicle. Once connected, or paired, the mobile device 114 may then be used to allow the VCS 102 to communicate with the communications network 116. In one example, data can be passed through the mobile device 114 via a data-over-voice or data-plan of the mobile device 114, through the network transceiver of the VCS 102, and into the processor 108 of the VCS 102. As an additional aspect, occupants of the vehicle may be identified according to the unique device identifiers associated with the mobile devices 114 brought into and connected with the VCS 102 of the vehicle.

Similar to the VCS 102, the mobile device 114 may also include one or more processors 108 configured to execute application instructions stored in a memory 110 of the mobile device 114. For instance, the mobile device 114 may be configured to execute a third-party application 118 in selective communication with an internet server 120 over the communications network 116. As another example, the mobile device 114 may be configured to execute a VCS client 122 application configured to interface with the functionality of the VCS 102 by way of an associated VCS interface 124 executed by the VCS 102. An exemplary VCS interface 124 may be the SYNC® AppLink component of the SYNC® system.

A payment reminder application 126 may be another application installed in the memory 100 of the VCS 102. The payment reminder application 126 may be configured to selectively provide payment reminders 130 to the VCS 102. Payment reminders 130 may include information such as: an identifier of the vehicle (e.g., VIN), an identifier of the occupant (e.g., occupant phone number), a priority, a delivery time, an alert description, a text description, a telephone number (e.g., to use to reach the loan provider), an action descriptor (e.g., provide a visual alert, provide text-to-speech alert) and a status (e.g., when the next payment is due, how delinquent the loan may be). The payment reminders 130 may then be provided to the occupants of the vehicle by way of the HMI 104 of the VCS 102.

To determine whether a payment reminder 130 is warranted, the payment reminder application 126 may be configured to communicate with a loan credit server 128 storing loan information. The payment reminder application 126 may be configured to send information to the loan credit server 128 such as: a VIN of the vehicle, the status of pending and delivered reminders, the identities of the occupants of the vehicle (e.g., determined according to presence of paired mobile devices 114 within the vehicle), and the capabilities of the vehicle to deliver a reminder (i.e., according to the capabilities of the VCS 102). The loan credit server 128 may in turn be configured to receive such information from one or more payment reminder applications 126, and may respond to the payment reminder application 126 to selectively send, schedule, or cancel the provisioning of payment reminders 130 to the VCS 102. The data communications between the payment reminder application 126 and the VCS 102 may be performed using a client-server protocol, for instance TCP/IP. Thus, by way of the payment reminder application 126 and the loan credit server 128, the VCS 102 may allow for the provisioning of payment reminders 130 to occupants of a vehicle, while avoiding privacy violations of calling the mobile device 114 directly or issues with out-of-data telephone information associated with the loan.

The loan credit server 128 may be further configured to create alert descriptors based on information such as the received capabilities of the vehicle to deliver a reminder. These descriptors may be sent to the VCS 102, such as by inclusion in or other association with the payment reminder 130, and may be descriptive of how payment reminders 130 are to be delivered and presented to the occupants of the vehicle. Exemplary alert descriptors may indicate for the VCS 102 to turn on an indicator light, to make an audible tone, to deliver a haptic message or to deliver a spoken message using a text-to-speech HMI 104 interface component of the VCS 102.

In some examples, to provide enhanced security, the payment reminder application 126 may be configured to provide for encrypted communications between the payment reminder application 126 and the loan credit server 128. As another feature, the payment reminder application 126 may provide a feature facilitating a vehicle occupant to call the loan company back upon receipt of a payment reminder 130. When the loan company receives the call, the vehicle VIN and the identity of the occupant may also be sent to the loan company (e.g., outside of the voice band such as in caller ID information), so when the call is received there is no need to identify the vehicle while someone is driving. For security, the payment reminder application 126 may be configured to verify a list of telephone numbers to which it will allow for the return of calls.

Figure 1B:
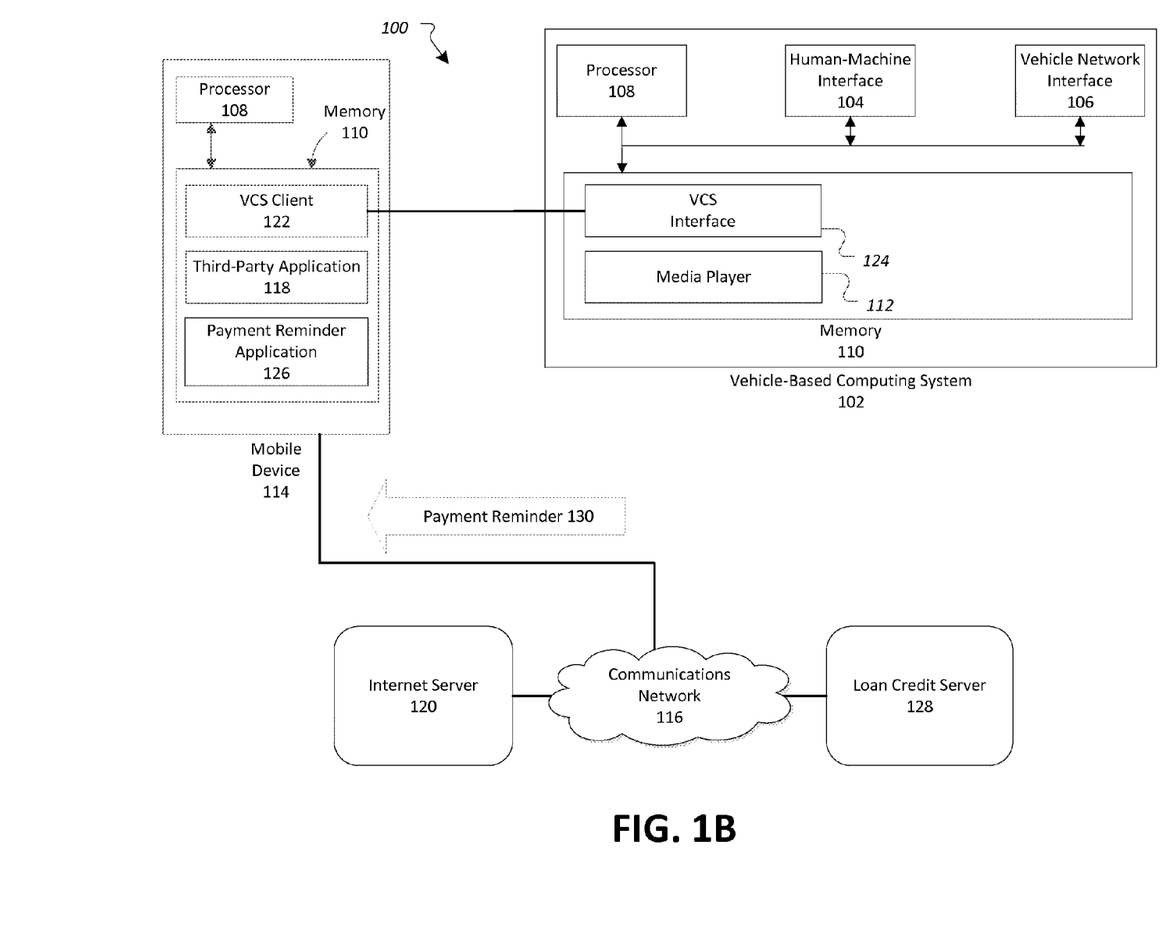

FIG. 1B illustrates an alternate exemplary system 100-B, in which the payment reminder application 126 may be installed on the mobile device 114 rather than on the VCS 102. In the alternate system 100-B, the payment reminder application 126 of the mobile device 114 may be in communication with the loan credit server 128 and also with the VCS 102. For instance, the VCS interface 124 of the VCS 102 may be utilized by a VCS client 122 of the mobile device 114 to identify the capabilities of the VCS 102, as well as to allow any received payment reminders 130 to be forwarded to the VCS 102 for provisioning to vehicle occupants.

Figure 1C:
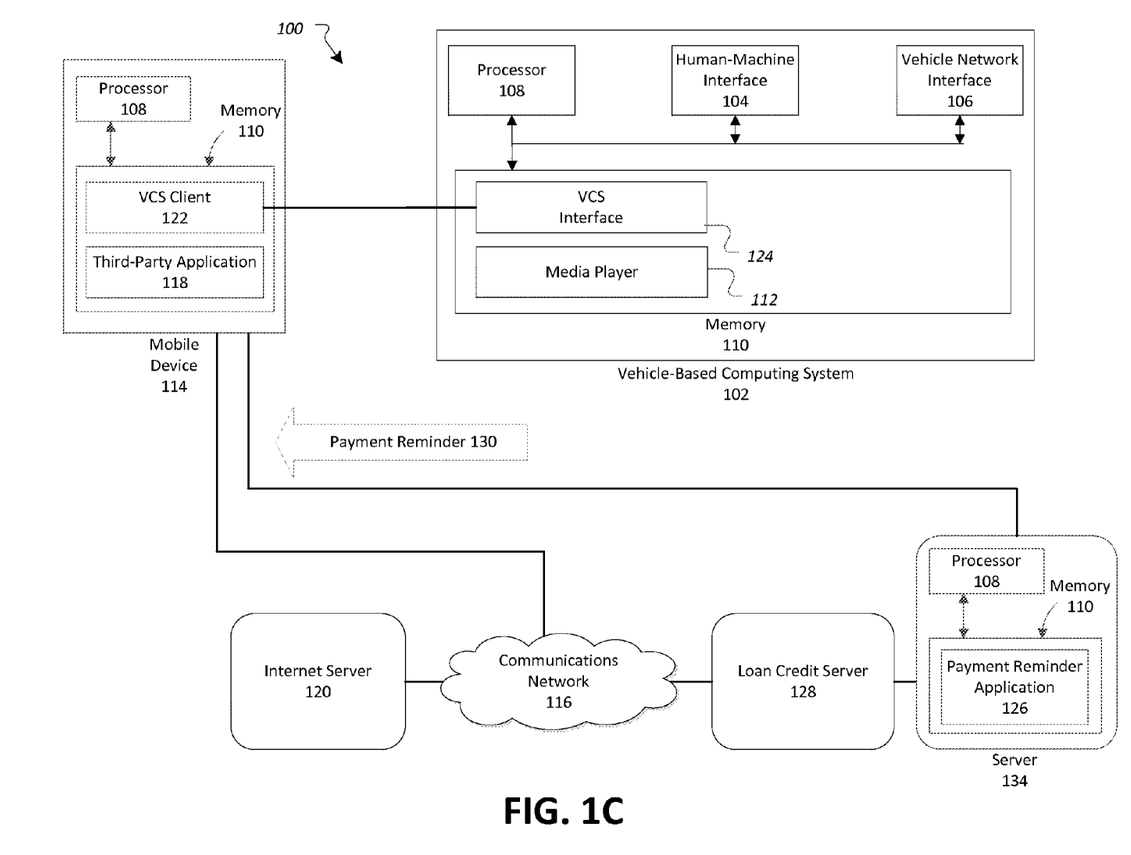

FIG. 1C illustrates an alternate exemplary system 100-C, in which the payment reminder application 126 may be installed on a memory 110 of a remote server 134, and may be executed by a processor 108 of the server 134. In the alternate system 100-C, the payment reminder application 126 of the server 134 may be in communication with the loan credit server 128 and also with the mobile device 114, and may send any required payment reminders 130 to the mobile device 114 to forward on to the VCS 102. Then, the VCS interface 124 of the VCS 102 may be utilized by a VCS client 122 of the mobile device 114 to allow any received payment reminders 130 to be forwarded to the VCS 102. In yet other exemplary systems 100, the payment reminder application 126 of the server 134 may be in communication with the VCS 102, such as through a vehicle network service provider 132, rather than through the mobile device 114. In still other exemplary systems 100 the payment reminder application 126 may, for example, be installed on the loan credit server 128 itself.

Figure 2:
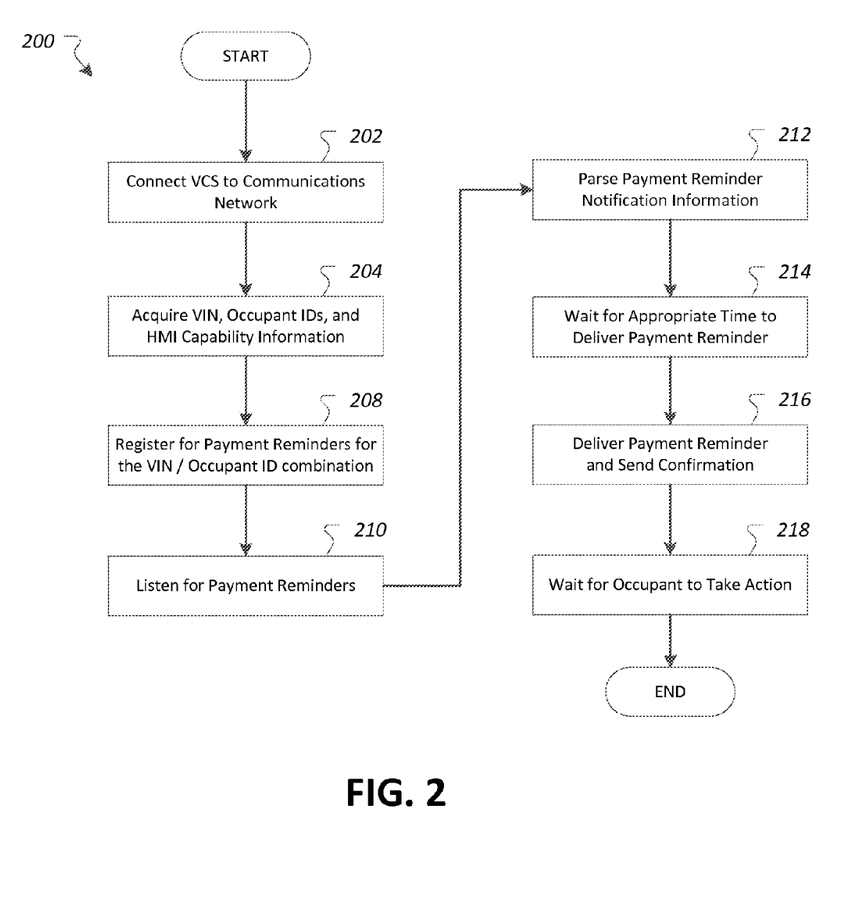
FIG. 2 illustrates an exemplary process for provisioning of payment reminders using a payment reminder application.

FIG. 2 illustrates an exemplary process 200 for provisioning of payment reminders 130 using a payment reminder application 126. The process 200 may be performed, for example, by a system 100 including a payment reminder application 126 associated with a vehicle and installed on a VCS 102, a mobile device 114 or a server 134.

In block 202, the payment reminder application 126 connects to a communications network 116. For example, in the case of a payment reminder application 126 installed on a memory of a VCS 102, the payment reminder application 126 may cause the VCS 102 to connect to a communications network 116 via a vehicle network service provider 132, or through an AppLink or Bluetooth® connection via a paired mobile device 114. The payment reminder application 126 may further acquire a network address. For example, the VCS 102 may acquire an IP address upon connection of the VCS 102 to the communications network 116 or vehicle network service provider 132, or of a paired mobile device 114 to the communications network 116

In block 204, the payment reminder application 126 acquires a VIN, occupant identifiers, and capability information of the HMI 104 of the VCS 102. For example, the payment reminder application 126 may identify the VIN according to the user account information associated with the VCS 102 (e.g., a VIN associated with a SYNC® account registered to the vehicle). The occupant identifiers may be determined, for example, according to identification of paired mobile devices 114 within the vehicle. Capability information of the HMI 104 of the VCS 102 may be identified according to querying for version information or VCS 102 settings or user preferences.

In block 206, the payment reminder application 126 registers with the loan credit server 128 for payment reminders 130 according to the VIN/occupant identifier combination. For example, the payment reminder application 126 may initiate a request for a network address of an appropriate loan credit server 128 by way of a digital name service. Using the network address, the payment reminder application 126 may register the determined VIN and occupant identifier combination with the loan credit server 128 to receive payment reminders 130.

In block 208, the payment reminder application 126 listens for payment reminders 130. For example, having registered the VIN/occupant identifier combination with the loan credit server 128, the payment reminder application 126 may wait to receive a payment reminder 130 from the loan credit server 128.

In block 210, the payment reminder application 126 parses the received payment reminders 130 for notification information. For example, the received payment reminder 130 may include notification information indicative of how to deliver the notification to the occupant of the vehicle using the vehicle HMI 104. As some possibilities, the payment reminder 130 may include notification information indicative of whether to turn on an indicator light, make an audible tone, deliver a haptic message or deliver a message using a text-to-speech HMI 104 interface component of the VCS 102.

In block 212, the payment reminder application 126 waits for an appropriate time to deliver the notification. For example, to avoid unnecessarily distracting the occupant when driving, the payment reminder application 126 may be configured to prioritize the urgency of the received payment reminder 130 and deliver the payment reminder 130 at an appropriate time, such as when the vehicle is stopped or being driven in a low risk situation. As another example, to avoid disclosing private or personal information about the vehicle owner to other vehicle occupants, the payment reminder application 126 may be configured to deliver the payment reminder 130 at an appropriate time to protect occupant privacy, such as when the vehicle owner is alone in the vehicle. To make the relative risk determination, the VCS 102 may use the vehicle network interface 106 to communicate with a workload estimator module configured to provide information with respect to the status of the driver, such as situational driving demands, level of driver drowsiness, or apparent correctness of driver commands to the situation. As a further example, to make the occupancy determination the VCS 102 may be configured to use the vehicle network interface 106 to facilitate communication with a restraint control module or occupant classification module configured to provide occupancy information (e.g., which seats appear to have weight on them, which seat belts are buckled.)

In block 214, the payment reminder application 126 delivers the notification to the occupant and sends a confirmation. For example, the payment reminder application 126 may use the notification information in the payment reminder 130 to deliver the payment reminder 130 to the occupant of the vehicle using the vehicle HMI 104. The payment reminder application 126 may further direct the VCS 102 of the vehicle to send an acknowledgement of the delivery of the payment reminder 130 back to the source of the payment reminder 130, e.g., to the loan credit server 128.

In block 216, the payment reminder application 126 waits for the occupant to request take an action. For example, the payment reminder application 126 may receive, via the HMI 104 of the VCS 102, an indication of action to take responsive to delivery of the payment reminder 130 to the occupant. Exemplary actions may include: requesting that the borrower contact the lender, calling a telephone number included in the payment reminder 130, confirming to make a payment, and requesting a further reminder to make the payment at a later date. In some examples, the VCS 102 may inform the loan credit server 128 of any action taken by the occupant. After block 216, the process 200 ends.

Figure 3:
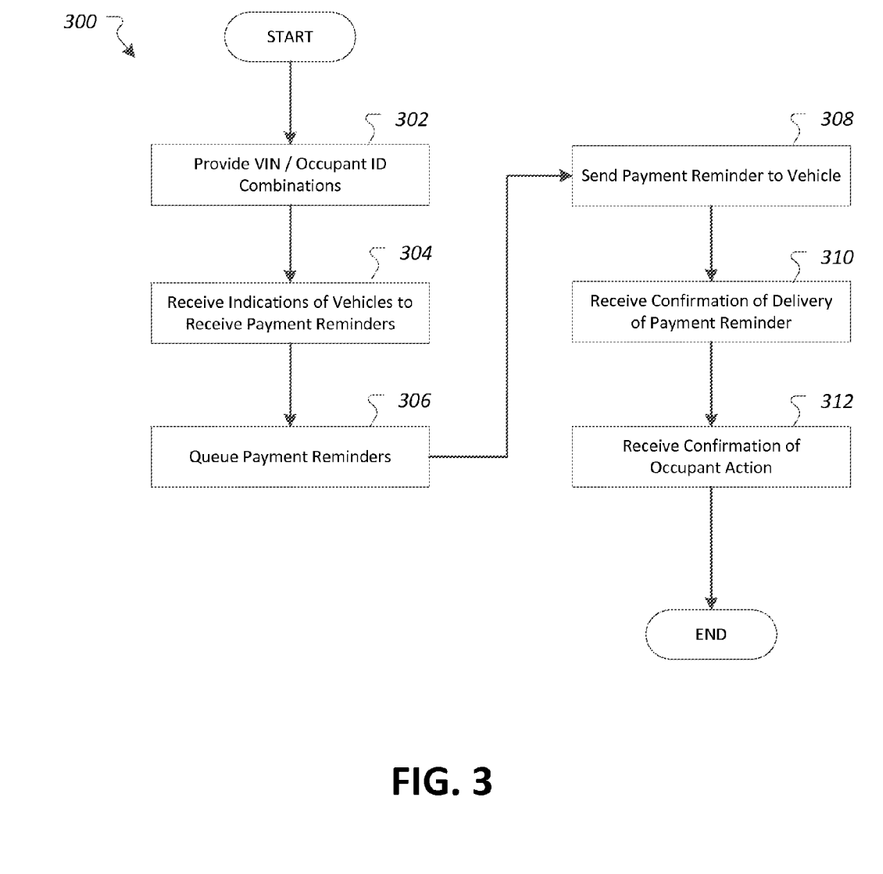
FIG. 3 illustrates an exemplary process for provisioning of payment reminders by a loan credit server.

FIG. 3 illustrates an exemplary process 300 for provisioning of payment reminders 130 by a loan credit server 128. The process 300 may be performed, for example, by the loan credit server 128 in communication with the VCS 102.

In block 302, the loan credit server 128 provides VIN/occupant identifier combinations. For example, the loan credit server 128 may provide registered VIN/occupant identifier combinations to a loan company for processing. The loan company (e.g., Ford Credit) may determine, based on the combinations, whether payment reminders 130 should be sent to the vehicles associated with the VIN/occupant identifier pairs.

In block 304, the loan credit server 128 received indications of which vehicles are to receive payment reminders 130. For example, the loan credit server 128 may receive indications of which vehicle/occupant identifier combinations should receive payment reminders 130. The loan credit server 128 may receive additional information as well, such as content or other information to be included in payment reminders 130, what actions should be offered to the vehicles upon receipt or presentation of the payment reminders 130, information about the capabilities of the VCS 102, and other aspects of the details of the notification process.

In block 306, the loan credit server 128 queues a payment reminder 130 notification. For example, the loan credit server 128 may receive indications of which vehicles are to receive payment reminders 130. The loan credit server 128 may then queue those received indications for ordered delivery to the appropriate vehicles associated with the VIN/Passenger ID combinations.

In block 308, the loan credit server 128 send the payment reminder 130 to the vehicle. For example, based on the information in the payment reminder 130, the loan credit server 128 may direct the payment reminder 130 to an address of the vehicle associated with the VIN/Passenger ID combination. The address for the payment reminder 130 may be determined, for example, according to SYNC® account information associated with the VIN of the vehicle receiving the payment reminder 130. The payment reminder 130 may further include information on how to deliver the notification to the occupant of the vehicle using the vehicle HMI 104. For example, the payment reminder 130 may include information indicative of whether to turn on an indicator light, make an audible tone, deliver a haptic message or deliver a message using a text-to-speech HMI 104 interface component of the VCS 102.

In block 310, the loan credit server 128 receives confirmation of delivery of the payment reminder 130 to the vehicle. For example, the VCS 102 of the vehicle may acknowledge the receipt of the payment reminder 130 back to the loan credit server 128. The acknowledgement may accordingly be received by the loan credit server 128. In some examples, the loan credit server 128 may record the acknowledgement of delivery or may inform the loan company or a third party of delivery of the payment reminder 130 so they may document which payment reminders 130 were received.

In block 312, the loan credit server 128 receives confirmation the occupant has taken action responsive to the payment reminder 130. For example, the VCS 102 of the vehicle may present the payment reminder 130 to the occupant of the vehicle, and may perform an action responsive to the payment reminder 130, such as calling a telephone number included in the payment reminder 130 or making a payment using the VCS 102. In some examples, the VCS 102 may inform the loan credit server 128 of any action that was taken. The loan credit server 128 may accordingly make a record of the action that was taken, or may inform the loan company or a third party of delivery of the payment reminder 130 of the action.

After block 312, the process 300 ends. Variations on the process 300 and possible. For example, while the process 300 references a loan company, in other examples, the loan credit server 128 may provide the vehicle/occupant identifier to a local data store of loan information, or to some other third party loan servicer or other organization.

Thus, by way of the payment reminder application 126, loan providers may have a mechanism to use to provide payment reminders 130 to vehicle owners by way of the vehicle itself, without having to rely on other contact information for the vehicle owners, such as phone number and other information that may become out-of-date. Moreover, the payment reminder application 126 may further provide for confirmation of receipt of the payment reminders 130 by the occupants of the vehicle, thereby ensuring that the person responsible for the loan is aware of any delinquency status of the loan.

Variations on the disclosed systems and methods are possible. For instance, because the payment reminder application 126 facilitates messaging of an owner of a vehicle, the payment reminder application 126 may also be used to deliver other messages targeted to the vehicle owner besides payment reminders 130. As some examples, the payment reminder application 126 may be used to provide targeted advertisements to the vehicle owner, such as offers to refinance the vehicle or related to incentives or finance deals on the purchase of a new vehicle. As some other examples, the payment reminder application 126 may be used as a more general mechanism to provide reminders to the vehicle owner, such as providing reminders of overdue library books, reminders to pick up groceries or other items on a shopping list, or reminders to pick up a person or thing.

In general, computing systems and/or devices, such as the VCS 102, mobile device 114 and loan credit server 128, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by BlackBerry of Waterloo, Canada, and the Android operating system developed by the Open Handset Alliance.

Computing devices such as the VCS 102, mobile device 114 and loan credit server 128 generally include computer-executable instructions such as the instructions of the payment reminder application 126, where the instructions may be executable by one or more processors 108. Computer-executable instructions may be compiled or interpreted from computer programs created using a variety of programming languages and/or technologies, including, without limitation, and either alone or in combination, Java™, C, C++, Objective C, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. The payment reminder application 126 may be such computer program products. In some example, the payment reminder application 126 may be provided as software that when executed by one or more processors 108 provides the operations described herein. Alternatively, the payment reminder application 126 may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
receiving, by a payment reminder application of a vehicle, a payment reminder requesting payment of a vehicle loan associated with a registered combination of a vehicle identifier of the vehicle and an occupant identifier of a mobile device of an individual responsible for the payment determined, by the vehicle, to be present within the vehicle; and
delivering the received payment reminder via a vehicle human-machine interface.

2. The method of claim 1, wherein the payment reminder is received from a loan credit server, and further comprising providing a confirmation to the loan credit server upon successful delivery of the payment reminder to the individual via the vehicle human-machine-interface.

3. The method of claim 2, further comprising registering the vehicle identifier and occupant identifier combination with the loan credit server for receiving the payment reminder.

4. The method of claim 1, further comprising delivering the received payment reminder when only the occupant identifier of the mobile device of the individual responsible for the payment of the vehicle loan is detected as being within the vehicle according to the detecting of unique identifiers of mobile devices inside the vehicle.

5. The method of claim 1, further comprising prioritizing delivery of the payment reminder according to information received from at least one of a workload estimator module, a restraint control module, and an occupant classification module.

6. The method of claim 1, wherein the payment reminder includes an alert of a loan payment due for a loan against the vehicle, and a due date for the loan payment.

7. The method of claim 6, wherein the payment reminder further includes a request for the occupant to call a telephone number specified by the payment reminder.

8. The method of claim 1, wherein the payment reminder further includes notification information indicative of what human-machine interface features to use to notify the occupant of the payment reminder.

9. A system comprising:
a computing device of a vehicle including a processor and a memory storing a payment reminder application, the payment reminder application being executable by the processor of the computing device to cause the computing device to
receive a payment reminder requesting at least one of contact with a lender of a vehicle loan and payment of the vehicle loan, the vehicle loan being associated with a registered combination of a vehicle identifier of the vehicle and an occupant identifier of a mobile device of an individual responsible for the payment of the vehicle loan;
verify that the individual responsible for the payment of the vehicle loan is available to receive the payment reminder, by detecting unique identifiers of mobile devices within the vehicle using a network transceiver of the vehicle configured to communicate with mobile devices of vehicle occupants; and
deliver the received payment reminder via a vehicle human-machine-interface when occupant identifiers associated with the mobile devices detected within the vehicle indicate presence of the responsible individual within the vehicle.

10. The system of claim 9, wherein the payment reminder is received from a loan credit server, and wherein the payment reminder application is further configured to cause the computing device to provide operations comprising providing a confirmation to the loan credit server upon successful delivery of the payment reminder.

11. The system of claim 10, wherein the payment reminder application is further configured to cause the computing device to register the vehicle identifier and occupant identifier combination with the loan credit server to receive the payment reminder.

12. The system of claim 9, wherein the payment reminder application is further configured to cause the computing device to deliver the received payment reminder when only the occupant identifier of the mobile device of the individual responsible for the payment of the vehicle loan is detected as being within the vehicle according to the detecting unique identifiers of mobile devices inside the vehicle.

13. The system of claim 9, wherein the payment reminder application is further configured to cause the computing device to prioritize delivery of the payment reminder at least in part according to information received from at least one of a workload estimator module and a restraint control module.

14. The system of claim 9, wherein the payment reminder includes an alert of a loan payment due for a loan against the vehicle, and a due date for the loan payment.

15. The system of claim 9, wherein the payment reminder further includes a request for the occupant to call a telephone number specified by the payment reminder.

16. The system of claim 9, wherein the payment reminder further includes notification information indicative of what human-machine interface features of the vehicle to use to notify the occupant of the payment reminder.

17. A non-transitory computer-readable medium embodying instructions that, when executed by a computing device, are configured to cause the computing device to:
receive a payment reminder requesting at least one of contact with a lender of a vehicle loan and payment of the vehicle loan, the vehicle loan being associated with a registered combination of a vehicle identifier of the vehicle and an occupant identifier of a mobile device of an individual responsible for the payment of the vehicle loan;
verify that the individual responsible for the payment of the vehicle loan is available to receive the payment reminder, by detecting unique identifiers of mobile devices within the vehicle using a network transceiver of the vehicle configured to communicate with mobile devices of vehicle occupants; and
deliver the received payment reminder via a vehicle human-machine-interface when occupant identifiers associated with the mobile devices detected within the vehicle indicate presence of the responsible individual within the vehicle.

18. The medium of claim 17, further embodying instructions configured to cause the computing device to register the vehicle identifier and occupant identifier combination with a loan credit server to receive the payment reminder.

19. The medium of claim 17, further embodying instructions configured to cause the computing device to prioritize delivery of the payment reminder according to information received from at least one of a workload estimator module and a restraint control module.

20. The medium of claim 17, wherein the payment reminder includes at least one of an alert of a loan payment due for a loan against the vehicle, a due date for the loan payment, a request for the occupant to call a telephone number specified by the payment reminder, and notification information indicative of what human-machine interface features of the vehicle to use to notify the occupant of the payment reminder.

\* \* \* \* \*